United States Patent [19]

Collins et al.

[11] Patent Number: 5,229,894
[45] Date of Patent: Jul. 20, 1993

[54] METHOD AND APPARATUS FOR READING AND DECODING INFORMATION USING A MAGNETORESISTIVE SENSOR

[75] Inventors: Alan J. Collins, Gwent; Selvaratnam, Cardiff, both of Wales

[73] Assignee: M.R. Sensors Limited, Cardiff, Wales

[21] Appl. No.: 808,935

[22] Filed: Dec. 13, 1991

Related U.S. Application Data

[63] Continuation of Ser. No. 311,925, Feb. 16, 1989, abandoned.

[30] Foreign Application Priority Data

Feb. 16, 1988 [GB] United Kingdom ............... 8803504

[51] Int. Cl.⁵ .......................... G11B 5/09; G11B 5/33
[52] U.S. Cl. .................................. 360/43; 360/113
[58] Field of Search ............... 235/449, 430; 360/113, 360/43, 41; 365/2

[56] References Cited

U.S. PATENT DOCUMENTS

| | | | |
|---|---|---|---|
| 3,949,193 | 4/1976 | Dowdell | 360/43 |
| 3,974,523 | 8/1976 | Miller et al. | 360/51 |
| 4,065,797 | 12/1977 | Nomura et al. | 360/113 |
| 4,151,600 | 4/1979 | de Jonge | 365/2 |
| 4,239,151 | 12/1980 | Enser et al. | 360/2 |
| 4,788,420 | 11/1988 | Chang et al. | 235/449 |
| 4,851,944 | 7/1989 | Mowry | 360/113 |

Primary Examiner—Andrew L. Sniezek
Assistant Examiner—Won Tae C. Kim
Attorney, Agent, or Firm—Hale and Dorr

[57] ABSTRACT

In a method and apparatus for decoding data recorded on magnetic storage medium such as a "swipe card" to yield decoded data values, a magnetoresistive sensor is used to read the data as a pulse stream from the medium and to measure the widths of the received pulses. The data is preferably stored in the medium by the technique of two-frequency phase coherent recording (F2F). By comparing the widths of pulses to be decoded with the widths of previously read pulses to which data values have already been allocated circuitry for derivin a clock signal from a self-clocking recorded signal can be dispensed with. Pulse widths may be measured by monitoring the output of counters (20) incremented by a fast clock for the duration of each pulse, and the pulse widths are compared by comparing counter outputs stored in a memory (28) using a microprocessor (26). To allow data to be read from the recording medium at a wide range of pulse repetition rates without excessively increasing counter capacity, thecounters (20) may be clocked at a variable rate dependent on the repetition rate of the received pulses.

17 Claims, 3 Drawing Sheets

METHOD AND APPARATUS FOR READING AND DECODING INFORMATION USING A MAGNETORESISTIVE SENSOR

This is a continuation of application Ser. No. 311,925 filed on Feb. 16, 1989 abandoned.

This invention relates to the reading and decoding of data from a recording medium, and is particularly applicable to reading and decoding data from a recording medium which is moved past a sensor at a variable speed.

It is well known to provide credit cards, identity cards or the like with a magnetic strip having information stored in it as a series of magnetic field variations which can be picked up by moving the strip across an inductive sensor coupled in a sensing circuit. Typically, the extraction of data involves deriving clock pulses and data pulses from the sensor signal using the sensing circuit hardware and then sampling the data whenever the clock pulses are low. It is also known to use a magneto-resistive sensor as an alternative to the inductive sensor.

It is an object of this invention to provide a method and apparatus for reading and decoding data from the medium in a relatively simple and reliable manner.

According to a first aspect of this invention, a method of retrieving information from a recording medium includes the steps of reading the information from the medium as a stream of data pulses, and decoding the data pulses to produce corresponding decoded data values by comparing the widths of successive data pulses with the width or widths of at least one reference data pulse read from the medium for which the decoded data value is known.

If relative movement is produced between the medium and the sensor and in such a manner that a rapid variation in the frequency of the stream of data pulses is likely (as would happen if a rapid acceleration or deceleration were to occur), it is preferable to select different reference pulses from the data pulses read from the medium and to use these successively for comparing with the pulses to be decoded. For example, the width of each pulse to be decoded may be compared with the width of the last occurring pulse of one or another known decoded value.

For simplicity of circuitry, it is preferable to read the information from the medium by means of a sensor operable to provide a time-varying electrical signal the amplitude of which is substantially constant as the speed of relative movement between the sensor and the medium, and thus the frequency of the stream of data pulses, varies. The sensor output may then be fed, after amplifcation if necessary, directly to a comparator with a fixed threshold. The constant amplitude of the received pulse stream for a series of magnetically stored pulses of equal width allows a squared waveform of substantially constant mark-to-space ratio to be obtained at the output of the comparator.

The data is preferably encoded using two frequency phase coherent (F2F) recording with the data pulses representing either first or second decoded data values, those pulses representing the first value being narrower than those representing the second. The first value may be the data bit '1', and the second the data bit '0'.

The actual pulse width associated with a data bit is a function of the characteristics of the head and medium, the recorded bit density and bit pattern, head-to-medium spacing, medium speed, and the amplifier and comparator used to process the head output. The head characteristic, head-to-medium spacing, amplifier and comparator can be optimised to a particular recording situation to enable decoding of data from the pulse widths associated with '1' and '0'; i.e. the difference in the pulse widths associated with '1's and '0's can be defined for a particular recording situation. In this way, circuitry for deriving a clock waveform from a self-clocking recorded signal can be dispensed with.

In one preferred embodiment an unbiased magnetoresistive sensor is used to read the pulse width associated with recorded data encoded on, for example, a magnetic strip on a swipe card using two frequency phase coherent recording. A substantially unbiased magnetoresistive sensor has a symmetrical characteristic about a 'zero' magnetic field and, if the recorded signal is bi-directional i.e. non-return to zero encoded, an effective doubling of frequency results. Due to this doubling of frequency only discrete pulse widths need to be measured in the preferred embodiment rather than counting consecutive 'high' and 'low' pulses which can be difficult.

The pulse widths can be measured using a gated fast clock with a counter or a set of counters, the counter or counters being of digital type, or, for low density recording, a software loop if a microprocesser is present. Other electronic techniques can also be employed to measure the pulse widths associated with the data. The frequency doubling produced with a bidirectional magnetic data signal on the medium gives rise to a data signal in which a recorded '1' is represented by two pulses, whereas a '0' is represented by only one. This enables error checking at bit level by ensuring that the first pulse associated with a '1' is followed by a pulse of similar width.

The basic method of decoding may be achieved by comparing the received pulse width with a previously received pulse width for either a '1' or a '0'. If, when compared with a pulse width for a '1', the received pulse width is greater than the previously received pulse width, then the received pulse width is determined as being a '0', providing there have been two consecutive pulses associated with a '1', otherwise it is determined to be a '1'. If, when compared with the pulse width for a '0', the received pulse width is less than the previously received pulse width, the received pulse width is determined as representing the first associated with a '1', otherwise it is determined as representing '0'. Tolerances of the allowable difference between pulses associated with a '1' and '0' can be set for a particular magnetic recording system. Ideally the pulse widths associated with a '1' should be 50% of those associated with a '0'.

If a reference pulse width is employed for a '1' or a '0' in the comparison procedure, the reference pulse width may be the pulse width of the preceding '0' or '1' as described above, providing it is within existing margins set for the '0' and '1'. As as alternative it may be the average of all the preceding '0's or '1's. Other statistical methods may be employed to derive the reference pulse width for a '0' or '1' from the preceding pulse widths. The actual method employed to derive the reference pulse width may be selected to suit the characteristics (particularly variations in the velocity of the medium) of the reading system including the mechanics of the system. The minimum and maximum allowed variation in speed of decoding is largely dependent on the basic accuracy of measuring pulse widths. An increase in the speed of decoding may be achieved by effectively controlling the frequency of the fast clock such that if the speed of the recorded medium past the sensor increases, then the clock frequency increases. Thus the frequency of the fast clock can be controlled by feedback to result in constant resolution over the required speed range. If the clock frequency were not varied then a very large counter would be required to accommodate slow movement of the recorded medium past the sensor, i.e. to avoid counter overflow.

According to a second aspect of the invention, there is provided apparatus for retrieving and decoding information from a recording medium comprising a transducer for reading the information from the medium as a stream of data pulses and a decoder operable to produce decoded data values corresponding to the data pulses including means for measuring the widths of the read pulses, storage means for storing the said pulse widths, and means operable to compare the widths of successively read pulses to be decoded with the width or widths of at least one reference data pulse read from the medium for which the decoded data value is known.

The invention will now be described by way of example with reference to the drawings in which.

Figure 2:
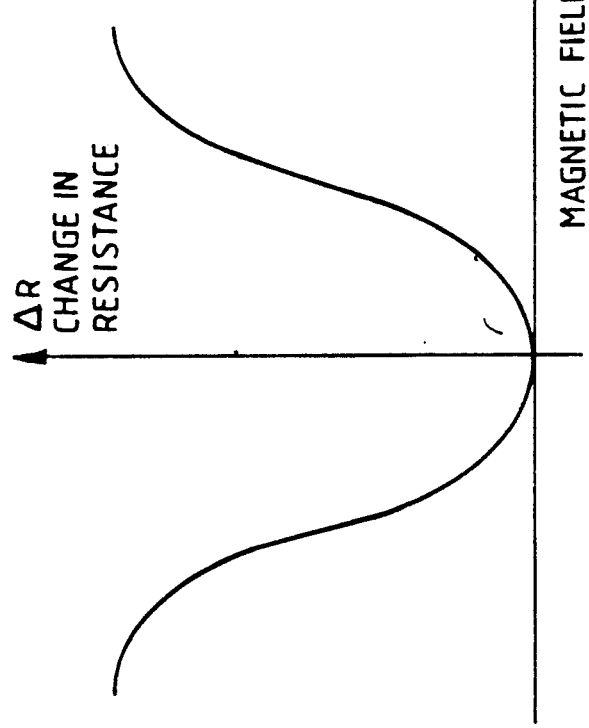
FIG. 2 is a graph showing the output characteristic of a magnetoresistive sensor.
Figure 3A:
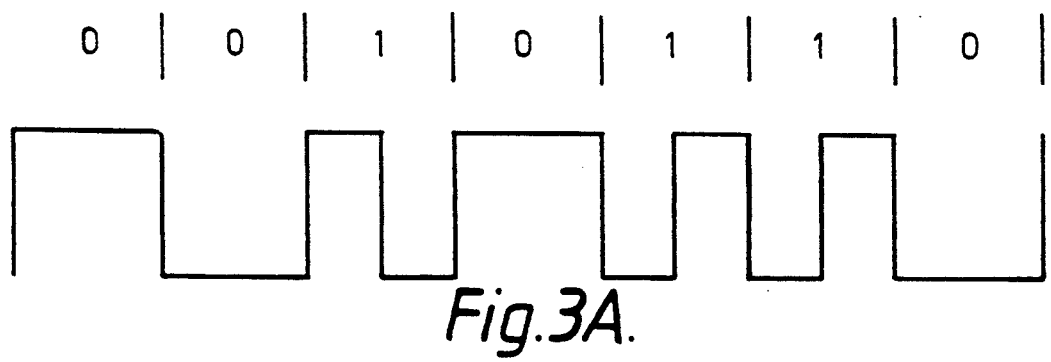
Figure 3B:
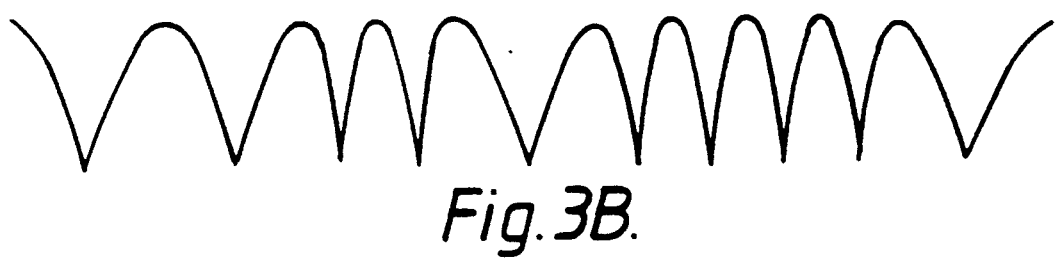
Figure 3C:
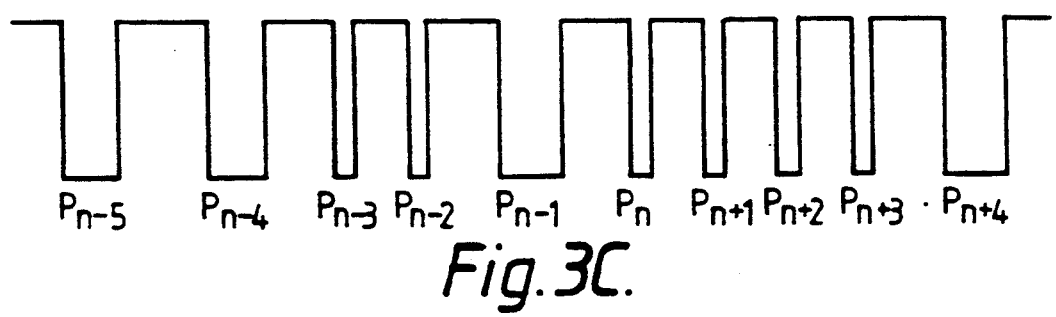
Figure 4:
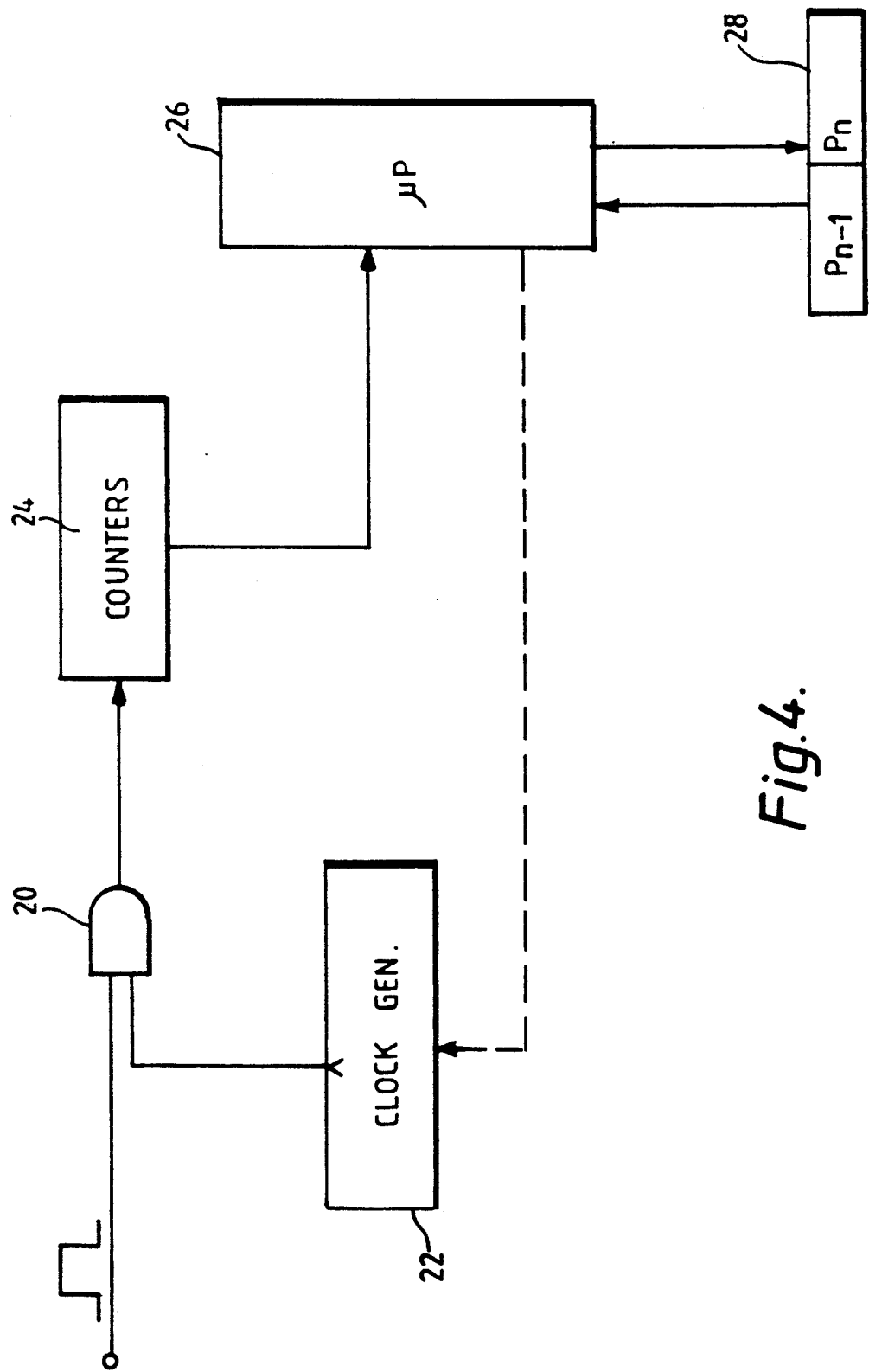

FIGS. 3A to 3C are waveform diagrams of, respectively, data encoded on magnetic tape using two-frequency phase coherent recording (F2F), an analogue signal derived from a magnetoresistive head reading the tape in which the amplitude of the output pulses associated with '1's is approximately equal to that of the output pulses associated with '0's, and the digital signal produced by the circuit of FIG. 2 when the signal of FIG. 3A is bi-directional; and FIG. 4 is a block diagram of a decoding system for the digital signal of FIG. 4.

Figure 1:
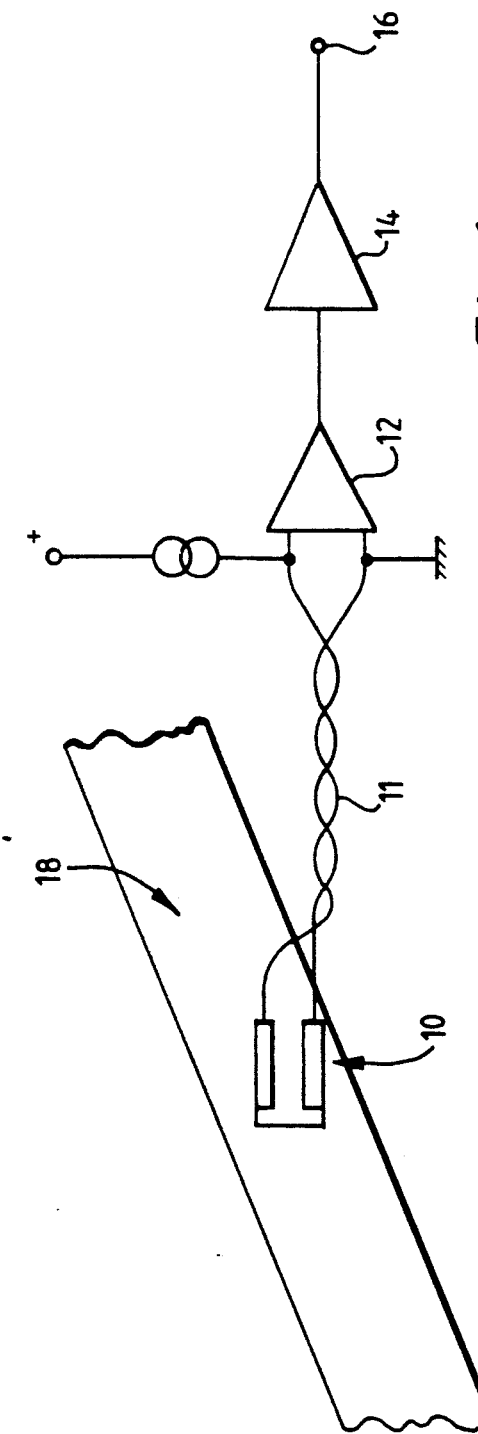
FIG. 1 is a diagram of an analogue input circuit for producing a digital signal using a magnetoresistive sensor.

Referring to FIG. 1, a card reader in accordance with the invention has an input stage comprising a magnetoresistive sensor 10, coupled by a twisted pair 11 of conductors to preamplifier 12. The output of the amplifier 12 is coupled to a comparator 14 having an output 16. When the magnetic layer 18 of a swipe card is passed over the magnetoresistive sensor 10, an electrical signal representative of coded data in the magnetic layer 18 is produced on conductors 11. In the present example, the sensor 10 is unbiased.

Referring to FIG. 2, it will be seen that the magnetoresistive sensor 10 has a symmetrical output vs. magnetic field characteristic. This holds true if the sensor is unbiased. If the magnetisation of the magnetic layer is bidirectional, a doubling of the pulse repetition rate of the electrical signal with respect to the repetition rate of the magnetic field variations will result as the magnetic layer 18 passes the sensor 10. The doubling effect is shown in FIGS. 3A to 3C.

The waveform of FIG. 3A is an example of two frequency phase coherent (F2F) recording, which is a method of recording data on a recording medium allowing the derivation of a clock waveform from the recorded data. The medium may be a magnetic layer on a swipe card or the like which, it will be appreciated, may be passed through a card reader at any speed over a wide range of speeds, and with some acceleration or deceleration. After amplification in amplifier 12 the waveform may appear as in FIG. 3B, while passage through the comparator 14 results in the waveform of FIG. 3C. It will be seen from FIG. 3C that the pulse width associated with a zero is greater than the width of the pulse (two) associated with a '1'. The ratio of the pulse widths associated with '1's and '0's is a function of previously defined parameters.

Referring now to FIG. 4, the digital pulsesignal from the comparator is fed to one input of an AND gate 20 having its other input coupled to a clock generator 22 arranged to feed to the AND gate 20 a fast clock waveform of a frequency considerably greater than the pulse repetition rate of the incoming data pulses. The resulting gated clock waveform is fed to a counter 24 having an output coupled to a microprocessor 26. In operation of the circuit of FIG. 4, the width of each positive-going pulse of the waveform of FIG. 4 is measured by counting the corresponding gated clock pulses in the counter 24. The resulting count is stored by the microprocessor 26 in an associated memory 28.

Evaluation of the pulses is performed by comparing in the microprocessor 26 the stored counts of different pulses. It will be understood that the decoding process may include storing the whole output obtained by passing a swipe card across the sensor before the comparison of pulse widths begins. Alternatively, storage and comparison may be performed on a real time basis. The function of the counter 24 may instead be implemented as a software loop executed by the microprocessor 26.

In a first method of decoding, the microprocessor 28 stores in the memory and compares the count $P_{n-a}$ for the last pulse representing a '0' and the count $P_n$ for a pulse to be decoded. If $P_n$ is less than $P_{n-a}$ by a present percentage, the pulse corresponding to $P_n$ is decoded as a '1' providing the next incoming pulse $P_{n+1}$ also has the characteristic of a '1'. When this occurs, the two pulses are decoded as a single data bit '1'. This provides a form of error checking. If $P_n$ is equal to $P_{n-a}$ within a fixed tolerance band, then the pulse is decoded as a '0'. Alternatively, the counts representing '1's can be used as reference counts, the microprocessor comparing the count $P_n$ of the pulse to be decoded with the count of the last occurring '1'. This method is satisfactory provided that the incoming data does not include large numbers of '1's or '0's in succession, as appropriate, when an acceleration or deceleration of the magnetic strip could result in errors.

A second method involves instead the comparison of $P_n$ with $P_{n-1}$ where $P_{n-1}$ is the width of the preceding pulse plus a fixed percentage in the case of a '0', or the total width of the two preceding pulses associated with a '1' plus a fixed percentage of the sum of the pulses.

Thirdly, a combination of the two methods can be used.

In FIG. 3C it will be seen that the widths of pulses are measured in the process described above. It is, of course, equally possible to operate on the pulse spacings, and all references to a pulse width or widths in this specification are to be construed as including a pulse spacing or spacings.

Alternatively statistical methods may be employed in evalating the pulse width of the reference '0' or '1' as described previously.

In each case the comparisons are performed with certain tolerances added to or subtracted from the reference count depending, for example, on the expected noise level or recording density (the higher the density the smaller the variation from bit to bit), the expected range of speed of the card in the reader, the accuracy of measurement of pulse width (i.e. the fast clock frequency), and the hysteresis of the comparator 14.

Typically the fast clock frequency is 100 kHz. However, it is possible within the scope of the invention to vary the fast clock frequency for the reasons mentioned hereinabove. To this end, the microprocessor 26 may be programmed to generate an output signal dependent on the values of counts received from the counter 24 to vary the clock frequency. Thus, if the counts exceed a predetermined value (caused by slow movement of the card), the output signal from the microprocessor may be used to reduce the clock frequency. Alternatively, continuous feedback may be used, whereby the clock frequency is maintained substantially equal to a fixed multiple of the underlying pulse repetition rate of the incoming data, so as to maintain constant resolution in the pulse width measurement. In fact, the frequency of the clock could be introduced into the decoding algorithm in the microprocessor as a multiplying factor. This allows accurate measurement of pulse width over a wide range of pulse repetition rates.

In the above examples of the decoding, decoding is achieved in real time. However it is possible to store all of the pulses associated with all the '1's and '0's encoded for example on a card, and to then decode to the system requirements. More complex statistical methods may then be applied to decode the data thus improving the reliability of the reading system. For example, in an insertion card reader in which the data may be read when the card is inserted and when it is withdrawn, post-processing of the pulse widths measured during insertion and when the card is removed may be used statistically to improve the reading reliability.

In some circumstances, it is advantageous to operate the magnetoresistive sensor 10 in a biased mode, i.e. exclusively on one side or other of the characteristic shown in FIG. 2. In this case, however, no frequency doubling occurs, and it is necessary to count both 'high' and 'low' excursions of the resulting signal.

It will be appreciated that random logic and an arithmetic logic unit (ALU) may be used to perform the same functions as the microprocessor.

We claim:

1. A method of reading and decoding information in a system that retrieves information stored on a magnetic recording medium by producing relative movement between the medium and a reader device, said movement being subject to speed variation during reading, said method comprising the steps of:

reading the information from the medium by means of a sensor in the reader device, an electrical resistance of said sensor varying according to a magnetic field to which it is subjected, the sensor being unbiased, wherein the reading step includes arranging for the sensor to be subject to bidirectional magnetic field variations representing a recorded signal containing the information as said relative movement occurs, the recorded signal being in the form of a bidirectional pulse train having positive- and negative-going pulses of one width which represent one data value and positive- and negative-going pulses of another, different width which represent another data value, so that the sensor yields an electrical signal in a form of a stream of data pulses having a repetition rate double that of the field variations, and decoding the pulse stream to produce decoded data values corresponding to said positive- and negative-going pulses by comparing the widths of successive data pulses of the pulse stream with the width or widths of at least one reference data pulse from the pulse stream for which the decoded data value is known.

2. A method according to claim 1, in which different reference pulses are selected from the data pulses of said pulse stream and are successively used for comparing with the widths of subsequent pulses in the pulse stream.

3. A method according to claim 1, wherein the electrical signal has an amplitude which is substantially constant as the speed of relative movement between the sensor and the medium varies.

4. A method according to claim 1, wherein the pulse widths are measured by operating at least one counter for durations of the respective pulses of said pulse stream.

5. A method according to claim 4, wherein the counter is clocked at a rate which is automatically adjusted according to repetition rate of the data pulses when read from the recording medium.

6. A method according to claim 1, wherein the step of decoding the pulse stream includes determining the width of the pulse, comparing the determined width with the width of a reference data pulse of known value, reading the decoded value of the reference pulse, and (a) if the decoded value of the reference pulse is said one data value and the width of the pulse to be decoded is greater than the width of the reference pulse by a predetermined margin, allocating to the pulse to be decoded said another data value, otherwise allocating it said one data value, or (b) if the decoded value of the reference pulse is said another data value and the width of the pulse to be decoded is less than the width of the reference pulse by a predetermined margin, allocating to the pulse to be decoded said one data value, otherwise allocating it said another data value.

7. A method according to claim 1, including maintaining an average of the widths of a plurality of pulses determined as representing a respective one of the said values, and comparing the width of a pulse to be decoded with the width represented by the said average.

8. A method according to claim 1, wherein the widths of the data pulses of the stream of data pulses are compared with the widths of the reference pulse or pulses in pairs, a decoded data value being assigned to each pair of pulses to be decoded only if the widths of the two pulses of the pair are both correspondingly related to the width or widths of a reference pulse or pulses.

9. A method according to claim 1, wherein the recorded signal is a two frequency phase coherent encoded signal having high pulses and low pulses, the pulses having different widths representing different data values, and wherein the decoding step comprises designating the pulses of the pulse stream obtained from the sensor as narrow pulses or wide pulses, each pair of consecutive narrow pulses being allocated a single first decoded data value and each wide pulse being allocated a single second decoded data value.

10. Apparatus for retrieving and decoding information stored on a magnetic recording medium, the apparatus including means for producing relative movement between the recording medium and a reader device in order to retrieve information, which movement is subject to speed variation during reading, wherein the apparatus comprises:

a sensor having an electrical resistance which varies according to a magnetic field to which it is subjected, the sensor being unbiased and being so arranged in the apparatus that, when said relative movement occurs, the sensor is subject to bidirectional magnetic field variations representing a recorded signal containing the information, the recorded information being in a form of a bidirectional pulse train having positive- and negative-going pulses of one width which represents one data value and positive-and negative-going pulses of another, different width which represent another data value, so that the sensor yields a stream of data pulses having a repetition rate double that of said field variations;

a decoder coupled to the sensor and operable to produce decoded data values corresponding to said positive- and negative-going pulses including means for measuring the widths of the pulses of said pulse stream;

storage means for receiving, from said means for measuring, and for storing said widths of pulses of said pulse stream; and means for receiving said pulse stream from said storage means and for comparing the widths of successive data pulses to be decoded with the width or widths of at least one reference data pulse from the pulse stream for which the decoded data value is known.

11. Apparatus according to claim 10, including reference updating means for selecting from the data pulses from the sensor different reference pulses for successive use by the comparison means.

12. Apparatus according to claim 10, wherein the sensor is operable to provide a time-varying electrical signal an amplitude of which is substantially constant as the speed of relative movement between the sensor and the medium varies.

13. Apparatus according to claim 10, wherein the data pulses represent either first or second decoded data values, those pulses representing the first value being narrower than those representing the second value, and wherein the comparing means is arranged to compare the width of a pulse to be decoded with the width of a reference data pulse and (a) if the decoded value of the reference pulse is the first value and the width of the pulse to be decoded is greater than the width of the reference pulse by a predetermined margin, to allocate to the pulse to be decoded the second value, otherwise to allocate it the first value, or (b) if the decoded value of the reference pulse is the second value and the width of the pulse to be decoded is less that the width of the reference pulse by a predetermined margin, to allocate to the pulse to be decoded the first value, otherwise to allocate it the second value.

14. Apparatus according to claim 10, wherein the storage means further comprises a means to determine and store an average of the widths of data pulses from the sensor determined as representing a respective one of the said values, and wherein the comparing means are operable to compare the width of a pulse to be decoded with the width represented by the said average.

15. Apparatus according to claim 10, wherein the measuring means comprise at least one counter.

16. Apparatus according to claim 15, including a clock source coupled to the counter or counters and arranged to feed to the counter or counters a clock signal a frequency of which is automatically adjustable according to the repetition rate of data pulses when read from the recording medium.

17. Apparatus according to claim 10, wherein the recorded signal is a bidirectional two frequency phase coherent encoded signal having high pulses and low pulses, the pulses having different widths representing different data values, and wherein the apparatus includes means for designating the pulses of the pulse stream obtained from the sensor as narrow pulses or wide pulses, and means for allocating to each pair of consecutive narrow pulses a single first decoded data value and to each wide pulse a single second decoded data value.

* * * * *